(12) United States Patent  
Chakra et al.

(10) Patent No.: US 9,930,141 B2  
(45) Date of Patent: Mar. 27, 2018

(54) AUTOMATICALLY ENFORCING UNIFORM RESOURCE LOCATOR WORKFLOW PRESENTATION

(71) Applicant: International Business Machines Corporation, Armonk, NY (US)

(72) Inventors: Al Chakra, Apex, NC (US); Liam Harpur, Skerries (IE); Michelle M. Purcell, Tullamore (IE); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 14/745,658

(22) Filed: Jun. 22, 2015

(65) Prior Publication Data

US 2016/0373552 A1    Dec. 22, 2016

(51) Int. Cl.
*H04L 29/08*    (2006.01)

(52) U.S. Cl.
CPC ............ *H04L 67/327* (2013.01); *H04L 67/02* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 5,708,780 A | 1/1998 | Levergood et al. | |
| 6,629,140 B1 | 9/2003 | Fertell et al. | |
| 6,920,505 B2 | 7/2005 | Hals et al. | |
| 7,133,833 B1 * | 11/2006 | Chone | G06Q 10/0633 705/7.27 |
| 7,155,451 B1 | 12/2006 | Torres | |
| 8,200,696 B2 | 6/2012 | Keohane et al. | |
| 8,495,484 B2 | 7/2013 | Ahmed et al. | |
| 9,235,649 B2 * | 1/2016 | Teng | |
| 9,466,048 B2 * | 10/2016 | Liggett | G06F 17/30864 |
| 2005/0210297 A1 * | 9/2005 | Wu | G06F 17/30884 726/19 |
| 2006/0059225 A1 | 3/2006 | Stonehocker et al. | |
| 2007/0143683 A1 | 6/2007 | Quimby | |
| 2008/0114791 A1 * | 5/2008 | Takatsu | G06Q 10/06 |
| 2010/0241518 A1 * | 9/2010 | McCann | G06Q 20/204 705/17 |
| 2013/0080910 A1 | 3/2013 | Bingell et al. | |
| 2013/0159826 A1 | 6/2013 | Mason et al. | |
| 2015/0126168 A1 | 5/2015 | MacWan | |

OTHER PUBLICATIONS

List of IBM Patents or Patent Applications Treated as Related, dated Nov. 13, 2017, 2 pages.

* cited by examiner

*Primary Examiner* — Thomas Dailey
(74) *Attorney, Agent, or Firm* — Scully, Scott, Murphy & Presser, P.C.; Steven J. Meyers

(57) ABSTRACT

Presenting URLs on a user interface to guide users on a specific URL browsing path over an internet. A plurality of URLs for a user to view on a user interface running in a computing environment may be received. A URL workflow may be created, which comprise a sequence of the plurality of URLs the user is directed to view. The URL workflow may be created dynamically based on monitoring the current activities of the user in the computing environment. Each URL may be presented one after another on the user interface to automatically direct the user to a next specified URL in the workflow.

17 Claims, 3 Drawing Sheets

AUTOMATICALLY ENFORCING UNIFORM RESOURCE LOCATOR WORKFLOW PRESENTATION

FIELD

The present application relates generally to computers and computer applications, and more particularly to electronic communications and web page or like content navigations on user interfaces.

BACKGROUND

There are many instances in which users are sent messages directing navigation of one or more Uniform Resource Locators (URLs). An example message may provide an instruction such as, "Click here . . . then go to this URL . . . after reading this . . . then go to another URL". Such instruction may be prone to user error, for example, both on the sender and recipient side, as the sending user and/or receiving user may get some instructions incorrectly. Additionally, the sender may want the user to not get distracted when navigating from one URL to another. For example, the recipient user may decide to check a news website half way through and so become less focused on the intent of the sender.

The following scenario illustrates an example. User A is a busy executive and regularly uses a web browser with many open windows and tabs. User A receives an e-mail asking User A to read three web pages in succession. Unfortunately, User A can easily get distracted with new activities and with the other web browser windows and tabs that are often not relevant to the new message User A received. User A only completes the three web pages after browsing to other URLs and attending to other interruptions. Thus, User A may not have the web page content browsed until the interruption clear in his mind.

There is no way for User A, using his current messaging and internet browser system, to provide a directed browsing experience based on URL flow, frequency used, activity, and based on rules and other criteria that are relevant to User A and User A's team. For instance, given a set of static links, it is at the users discretion on what way and order to view the URLs.

BRIEF SUMMARY

A computer-implemented method and system of presenting URLs on a user interface to guide users on a specific URL browsing path over an internet, may be provided. The method may be performed by one or more processors. The method may comprise receiving via an electronic communication a plurality of URLs for a user to view on a user interface running in a computing environment. The method may also comprise creating a URL workflow, the URL workflow comprising a sequence of the plurality of URLs the user is directed to view. The URL workflow may be created dynamically based on monitoring the current activities of the user in the computing environment. The method may also comprise automatically presenting each URL one after another on the user interface to automatically direct the user to a next specified URL in the workflow.

A system of presenting URLs on a user interface to guide users on a specific URL browsing path over an internet, in one aspect, may comprise an application plug-in running on one or more processors, the application plug-in operable to receive a plurality of URLs for a user to view. The application plug-in may be further operable to create a URL workflow, the URL workflow comprising a sequence of the plurality of URLs the user is directed to view. The application plug-in may create the URL workflow based on monitoring the current activities of the user in the user's computing environment. The application plug-in may be further operable to automatically present each URL one after another on the user interface to automatically direct the user to a next specified URL in the workflow.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
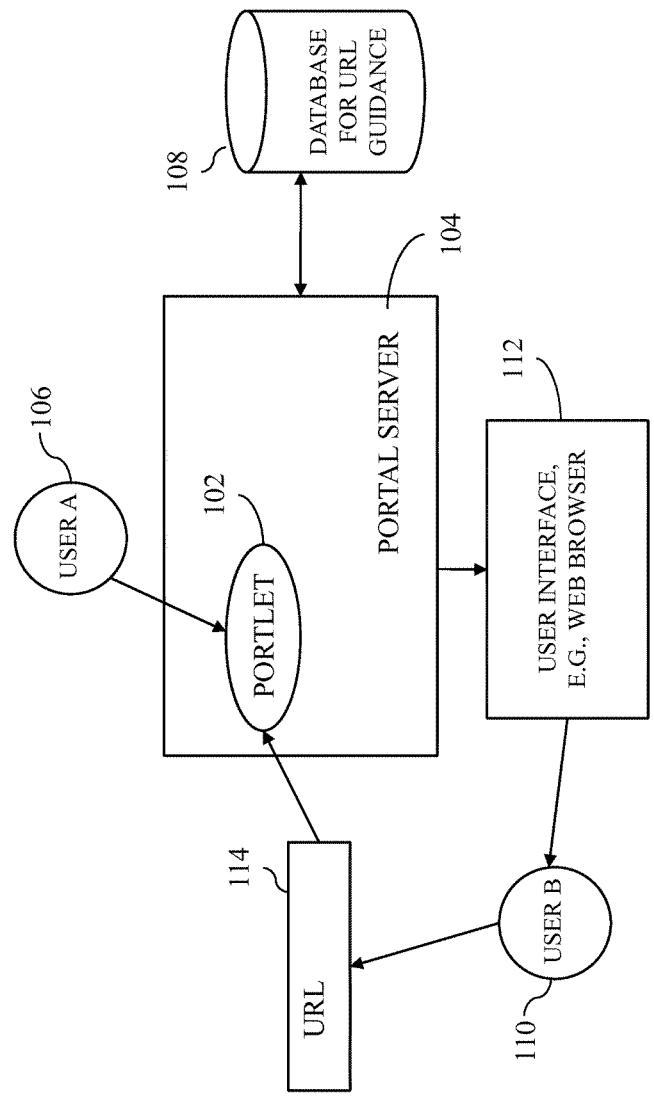
FIG. 1 is a diagram illustrating components of a system that automatically enforces uniform resource locator or like workflow presentation on a user interface in one embodiment of the present disclosure.

In one embodiment of the present disclosure, techniques, method and/or system may be provided for orchestrating the viewing behavior of individuals and groups in view web pages, for example, over the Internet. It may be advantageous that users consume or view several web pages in a given order. An embodiment of the present disclosure orchestrates the way web pages are presented or viewed, for example, based on frequency and activity criteria and other criteria that are relevant to individuals and teams. In one aspect, rules may be applied for leveraging existing tools (such as iWidgets and portlets) and autonomously or automatically based on explicit, and organizational and/or social network criteria.

A method and/or system of the present disclosure in one embodiment allow a user to have a relevant and actionable URL link browsing experience. In existing URL links, much of the content is static and becomes somewhat stagnant. In one embodiment of the present disclosure, technologies such as iWidgets and portlets may be leveraged, and combined with knowledge user's role and activity (e.g., frequency used of URL, current user activity in horizontal applications, business and user rules) to provide a more relevant and actionable URL link.

A portlet is a Web-based component. Portlets process requests and generate dynamic content. A portlet is implemented in a way that the end-user sees the portlet as being a specialized content area within a Web page that occupies a window in a portal page, such an Internet gateway. A portlet may be invoked in a single request of a portal page. A portlet interface may be used by the portlet container to invoke the portlet. A portlet may be a JAVA-based component managed by a portlet container. A portlet interface may be implemented, which a portlet container can use to invoke the portlet. For instance, a portlet may be built as a class that implements the javax.portlet.Portlet interface, packaged and deployed as a Web application ARchive file inside of a portlet container. Similarly, a web widget is an application, for example, with specific functionality that can be installed and executed within a web page by an end user.

A method and/or system of the present disclosure in one embodiment provide dynamic creation and placement of "URL workflows" for individual users, dynamic creation and placement of "URL workflows" for individual users that takes into account the current activity and role of the user, for example, allowing users of the URL links to become more efficient, for example, as they can focus on completing activities in a shorter time without interruption. The rules may be stored in a persistent storage which may be accessed for determining the workflow. An example of a rule may include, "a sender of data that motivates a modification of the URL workflow must be at least one level higher than the consumer of the URL flow by 2 degrees in the Lightweight Directory Access Protocol (LDAP) system." Another example of a rule may be, "a flow modification only occurs if consumer A belongs to task Y."

The functionality provided by the method of the present disclosure in one embodiment may be configured in a messaging system, for example, as an integral or plug-in component. Another type of system may utilize the functionality of the method and/or system of the present disclosure. The functionality may be configured, for example, so as to provide an option to enable or disable the functionality in the message system. In another aspect, the method and/or system of the present disclosure may be implemented as standalone functionality. The functionality may be implemented in a server-side or a client side embodiment.

In one aspect, the functionality, for example, may be enabled for users based on their organization and social network criteria. For instance, the functionality may be enabled for more senior managers.

A workflow engine may monitor current user activity to motivate desired URL browsing activity. The user or an organization may specify one or more rules that help manage the URL page browsing. For example, a rule may be implemented whereby some or all of the content may be motivated by previous URL activity or activity in horizontal applications.

A user interface (UI) or a graphical user interface (GUI) may be provided that allow a user to input the desired web pages for browsing. An example of such input may include: "http://www.bbc.com/->http://edition.cnn.com/->http://news.sky.com/skynews/".

The user interface allows the user or sender to send the recipient a set of URL links by sending to a portlet. The recipient user opens the portlet to view the sender's message including the URL links. The portlet application monitors the activity and the progress of the user. After each URL is viewed, the portlet application proceeds to direct the user to the next specified URL.

The method and/or system of the present disclosure in one embodiment orchestrates the viewing (constraint on the order, sequence, viewing behavior, and so forth). Once a specified URL has been consumed, the method and/or system of the present disclosure in one embodiment automatically present to the user the next specified URL, enforcing the viewing of that next URL.

FIG. 1 is a diagram illustrating components of a system that automatically enforces uniform resource locator or like workflow presentation on a user interface in one embodiment of the present disclosure. A portlet 102 or a widget, or another application, may be implemented that runs on a portal server 104. The portal server 104, for example, runs on one or more hardware processors, and provides Internet gateway to users. For example, via the portal server 104, users may browse the Internet, navigate to different web pages on the World Wide Web. The portal server 104 includes capability to invoke the portlet or like application 102, by an application programming interface (API) provided by the portlet 102.

A browser window 112 provided by the portal server 104, for example, allows User B, via a User B's device 110 to input a list or set of URLs (or liked address of content) 114 to the portlet 102. For instance, the portlet 102 allows User B to send the list of URLs to User A 106. The list of URLs are those that User B would like User A to view.

The portlet (or any web element such as widget or a mashup of widgets) 102 receives the input URLs or the like and creates an URL workflow. In one embodiment, the portlet 102 also takes into consideration one or more criteria or rules stored in a persistent storage 108, in creating the URL workflow.

Responsive to User A, e.g., via a User A's device 106, receiving the message containing the URLs, and e.g., invoking the portlet 102 via the portal server 104, the portlet 102 presents the URLs in the order specified in the URL workflow. For example, the portlet 102 may display or present, on User A's display device, only those URLs in the URL workflow according to a specific order, in a graphical user interface (GUI) window associated with the portlet 102. For example, after User A views a URL in the workflow, the GUI window associated with the portlet 102 would automatically display or present the next URL in the URL workflow. For example, an input element such as a button may be added to the GUI, for example, a button called "NEXT" that fits on top of the currently viewed page that takes the user to the next URL. As another example implementation, an existing browser's forward and backward buttons may be manipulated to adhere to the URL flow. Still another example implementation is to implement a short key or keyboard hot key.

Figure 2:
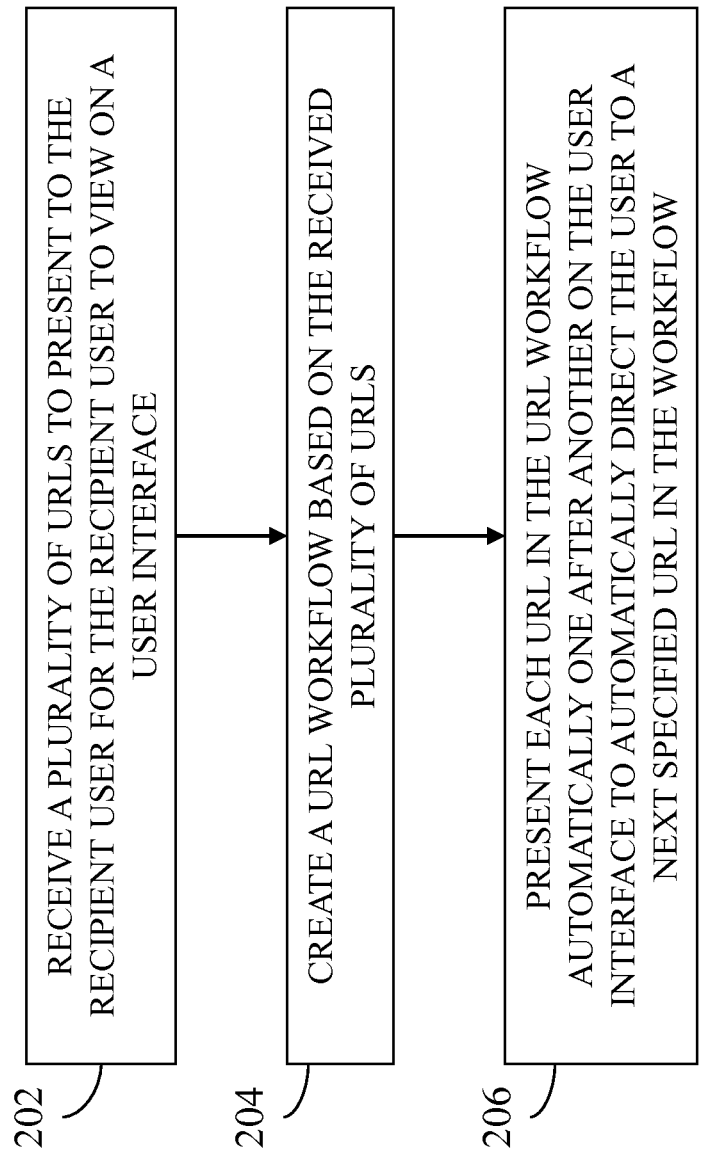
FIG. 2 is a diagram illustrating a computer-implemented method of presenting URLs on a user interface to guide users on a specific URL browsing path over an internet.

FIG. 2 is a diagram illustrating a computer-implemented method of presenting URLs on a user interface to guide users on a specific URL browsing path over an internet. The method may be performed by one or more processors. At 202, a plurality of URLs may be received to present to the recipient user for the recipient user to view on a user interface, for example, a browser running in a computing environment. The plurality of URLs may be input by a sender, for example, on a provided user interface.

At 204, a URL workflow is created. The URL workflow comprises a sequence of the plurality of URLs the user is directed to view. The URL workflow is created dynamically based on monitoring the current activities of the user in the computing environment, one or more rules, and/or a user role. The current activities of the user comprise one or more of current user activity on another browser tab or window and current user activity in horizontal applications.

At 206, each URL in the URL workflow is presented automatically one after another on the user interface to automatically direct the user to a next specified URL in the workflow. In one embodiment, the URLs are presented in a specified order. For instance, a portlet or the like application may cause or trigger the URLs to be presented in a predetermined order according to the workflow.

A portlet application or a widget or the like may receive the plurality of URLs from a sender sending the URLs to the recipient user. The portlet application or the widget or the like may monitor the current activities of the recipient user and progress of the recipient user viewing the URLs.

The dynamically created URL workflow orchestrates the recipient user's viewing of the URLs by specified order and viewing behavior. The user is automatically directed to view the next specified URL after a specified URL has been consumed. An orchestration engine implemented in a plug-in such as a portlet or a widget may line up the viewing of a plurality of web pages and URLs and persist the order of the URLs in a widget, portlet, or any type of web element to enforce such order of viewing. Such enforcing of the URL viewing in the order may increase productivity in accomplishing a particular task.

Figure 3:
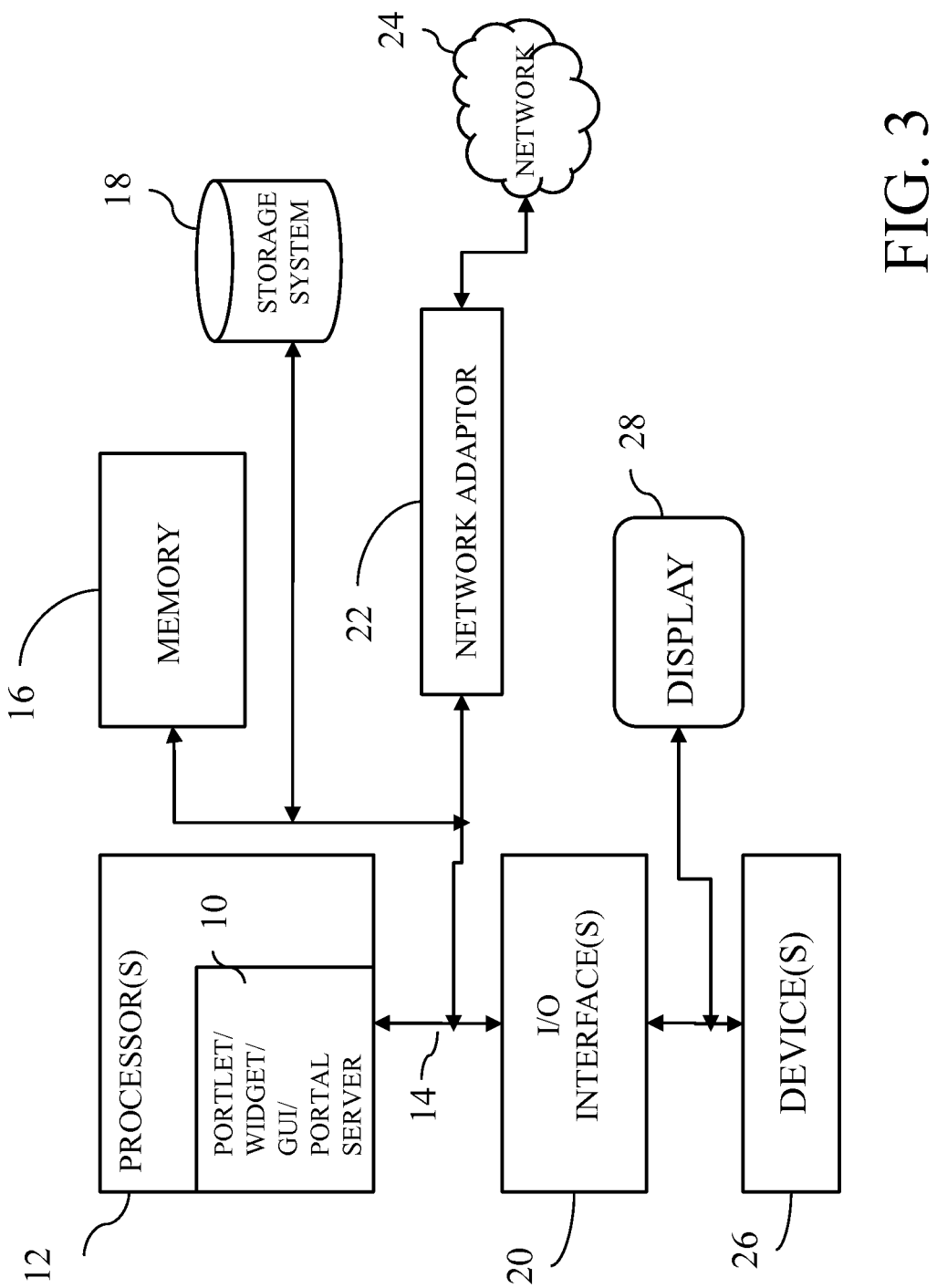
FIG. 3 illustrates a schematic of an example computer or processing system that may implement the system one embodiment of the present disclosure that automatically enforces uniform resource locator or like workflow presentation on a user interface.

FIG. 3 illustrates a schematic of an example computer or processing system that may implement the system one embodiment of the present disclosure that automatically enforces uniform resource locator or like workflow presentation on a user interface. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a portlet and/or portal server 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of presenting URLs on a user interface to guide users on a specific URL browsing path over an internet, the method performed by one or more processors, comprising:

receiving a plurality of URLs for a user to view on a user interface running in a computing environment;

responsive to receiving the plurality of the URLs, creating a URL workflow, the URL workflow comprising a sequence of the plurality of URLs the user is directed to view, wherein the URL workflow is created dynamically based on monitoring the current activities of the user in the computing environment and rules, the current activities comprising whether the user is also browsing on another browser tab of the user interface, whether the user is also browsing on another browsing window of the user interface, and the rules comprise that a sender of the plurality of the URLs is at least one level higher than the user by 2 degrees in a Lightweight Directory Access Protocol (LDAP) system and that the URL flow be modified if the user belongs to a given task; and causing each URL to be automatically presented each URL one after another on the user interface to automatically direct the user to a next specified URL in the workflow.

2. The method of claim 1, wherein the URL workflow is created dynamically further based on a user role of the user.

3. The method of claim 1, wherein the current activities of the user further comprise current user activity in horizontal applications.

4. The method of claim 3, wherein a portlet application receives the plurality of URLs from a sender sending the URLs to the user, and the portlet application monitors the current activities of the user and progress of the user viewing the URLs.

5. The method of claim 1, wherein the dynamically created URL workflow orchestrates the user's viewing of the URLs by a predetermined order and viewing behavior, wherein the user is automatically directed to view a next specified URL after a specified URL has been consumed.

6. The method of claim 1, wherein a widget implements the method.

7. A non-transitory computer readable storage medium storing a program of instructions executable by a machine to perform a method of presenting URLs on a user interface to guide users on a specific URL browsing path over an internet, the method performed by one or more processors, comprising:

receiving a plurality of URLs for a user to view on a user interface running in a computing environment;

responsive to receiving the plurality of the URLs, creating a URL workflow, the URL workflow comprising a sequence of the plurality of URLs the user is directed to view, wherein the URL workflow is created dynamically based on monitoring the current activities of the user in the computing environment and rules, the current activities comprising whether the user is also browsing on another browser tab of the user interface, whether the user is also browsing on another browsing window of the user interface, and the rules comprise that a sender of the plurality of the URLs is at least one level higher than the user by 2 degrees in a Lightweight Directory Access Protocol (LDAP) system and that the URL flow be modified if the user belongs to a given task; and triggering each URL to be automatically presented one after another on the user interface to automatically direct the user to a next specified URL in the workflow.

8. The non-transitory computer readable storage medium of claim 7, wherein the URL workflow is created dynamically further based on a user role of the user.

9. The non-transitory computer readable storage medium of claim 7, wherein the current activities of the user further comprise current user activity in horizontal applications.

10. The non-transitory computer readable storage medium of claim 9, wherein a portlet application receives the plurality of URLs from a sender sending the URLs to the user, and the portlet application monitors the current activities of the user and progress of the user viewing the URLs.

11. The non-transitory computer readable storage medium of claim 7, wherein the dynamically created URL workflow orchestrates the user's viewing of the URLs by a predetermined order and viewing behavior, wherein the user is automatically directed to view a next specified URL after a specified URL has been consumed.

12. A system of presenting URLs on a user interface to guide users on a specific URL browsing path over an internet, comprising:

one or more processors;

an application plug-in running on one or more of the processors, the application plug-in operable to receive a plurality of URLs for a user to view, the application plug-in further operable to create a URL workflow, the URL workflow comprising a sequence of the plurality of URLs the user is directed to view, wherein the application plug-in creates the URL workflow based on monitoring the current activities of the user in the user's computing environment and rules, the current activities comprising whether the user is also browsing on another browser tab of the user interface, whether the user is also browsing on another browsing window of the user interface, and the rules comprise that a sender of the plurality of the URLs is at least one level higher than the user by 2 degrees in a Lightweight Directory Access Protocol (LDAP) system and that the URL flow be modified if the user belongs to a given task, the application plug-in further operable to cause each URL to be presented one after another on the user interface to automatically direct the user to a next specified URL in the workflow.

13. The system of claim 12, wherein the URL workflow is created dynamically further based on a user role of the user, information associated with the user role stored on the storage device.

14. The system of claim 12, wherein the current activities of the user further comprise current user activity in horizontal applications.

15. The system of claim 12, wherein the application plug-in comprises a portlet application invoked within a portal server.

16. The system of claim 12, wherein the application plug-in comprises a widget.

17. The system of claim 12, wherein the dynamically created URL workflow orchestrates the user's viewing of the URLs by a predetermined order and viewing behavior, wherein the user is automatically directed to view a next specified URL after a specified URL has been consumed.

* * * * *